Feb. 19, 1929.
O. B. FRIEDEL
MOUTH ORGAN
Filed March 17, 1926     3 Sheets-Sheet 1
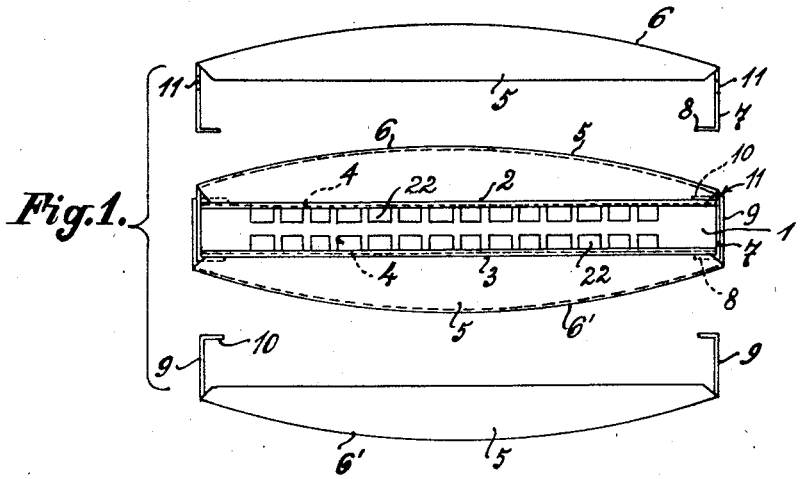
Fig.1.
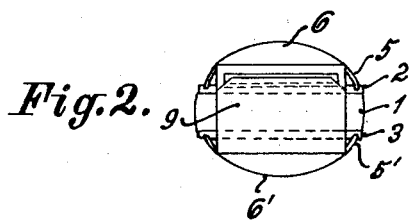
Fig.2.
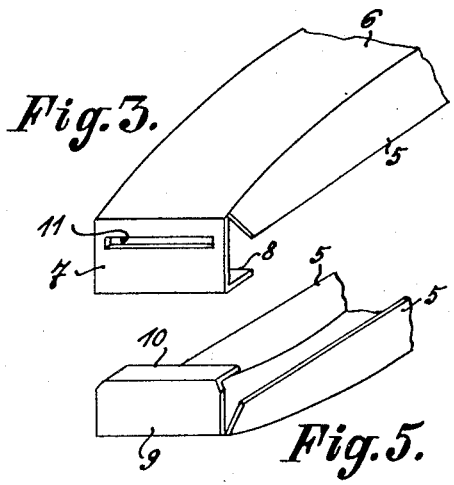
Fig.3.
Fig.5.
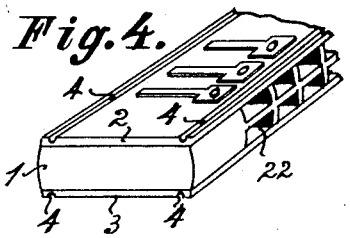
Fig.4.
Inventor
Otto Bruno Friedel
By
William L. Symons
his Attorney

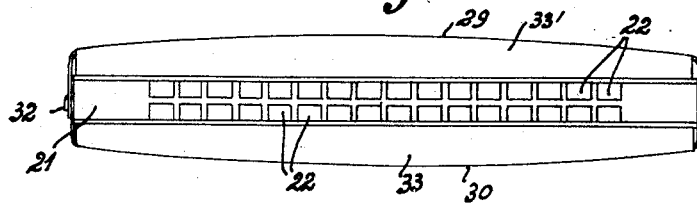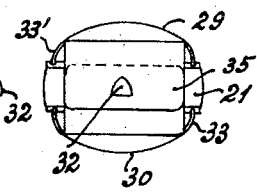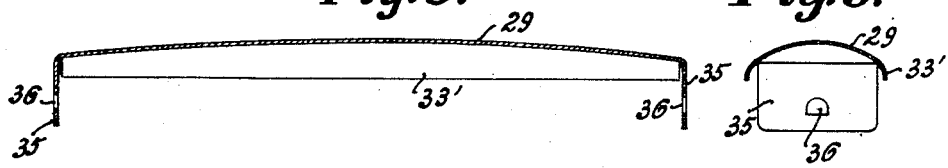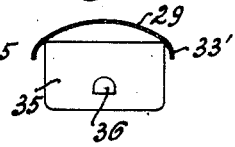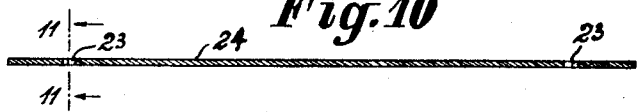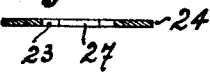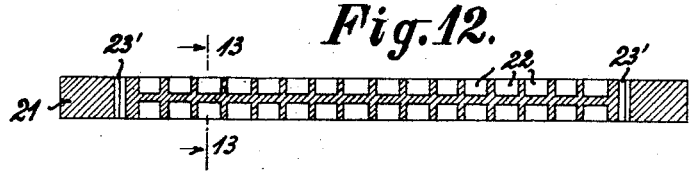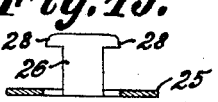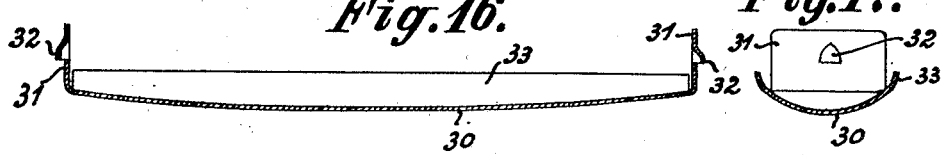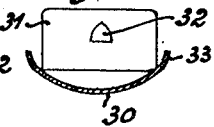

Feb. 19, 1929.
O. B. FRIEDEL
1,702,538
MOUTH ORGAN
Filed March 17, 1926   3 Sheets-Sheet 3
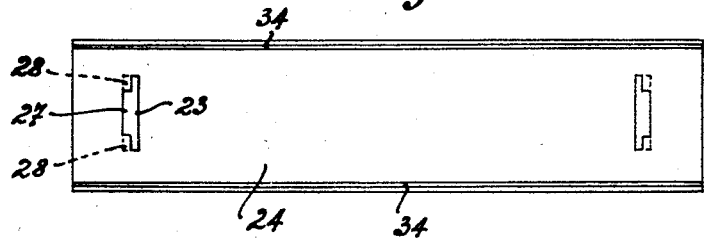
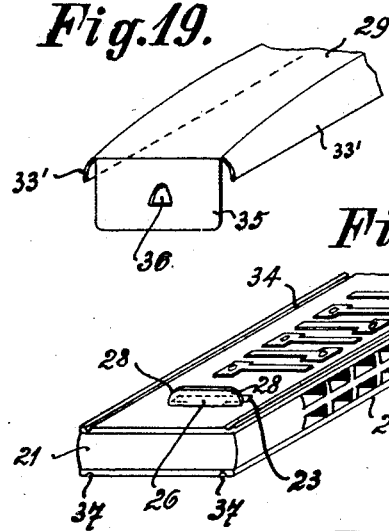
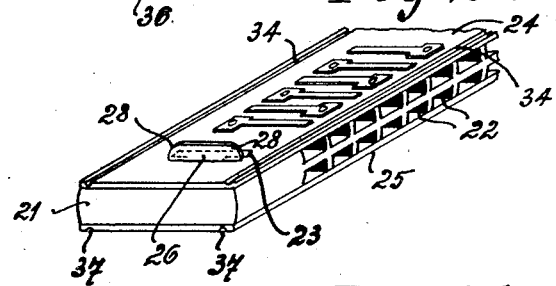
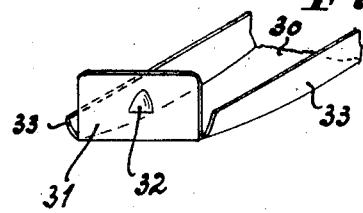

Patented Feb. 19, 1929.

1,702,538

UNITED STATES PATENT OFFICE.

OTTO BRUNO FRIEDEL, OF OBERSACHSENBERG, GERMANY.

MOUTH ORGAN.

Application filed March 17, 1926, Serial No. 95,445, and in Germany April 7, 1925.

My invention relates to mouth organs and more particularly to a method of, and to means for, assembling the parts of a mouth organ without using nails or other permanent fixtures, so that the parts may be readily taken asunder for exchanging reed plates, cleaning, etc., and as readily reassembled. No implements of any kind are required for the assembling or exchanging operations. The elimination of nailing etc. not only saves time and labour but also prevents damage to the parts of the organ and disarrangement of its reeds. In the existing organs, cleaning is impracticable and damaged reed plates cannot be exchanged for good ones so that the instrument becomes unserviceable by failure of a reed plate.

According to my invention, I assemble the parts of a mouth organ, viz. the reed plates and the body, by means of resilient cover plates so that the parts are held assembled by the pressure of said cover plates and will come apart when the plates are removed.

By exchanging the reed plates, it is possible to convert, say, a tremolo organ into a third organ. Exchangeable reed plates may be held in stock and supplied with an organ so that the player is able to play any number of pitches alternately and need not obtain a separate instrument for each pitch.

In the drawings affixed to this specification, two mouth organs embodying my invention are illustrated by way of example.

Figs. 1 to 5 illustrate a mouth organ in which the reed plates are held by the end walls of the cover plates, Figs. 6 to 21 illustrate a mouth organ in which the reed plates are interlocked and are held in that relation by the end walls of the cover plates.

More particularly,

Fig. 1 is an elevation of the organ, showing the upper and lower cover plates separately, Fig. 2 is an end elevation of the organ, Figs. 3, 4, 5 are perspective part views of the upper cover plate, the body with the reed plates, and the lower cover plate, respectively.

Fig. 6 is an elevation,

Fig. 7 is an end view of the organ,

Figs. 8 and 9, 16 and 17 are elevations and end elevations, respectively, of the upper and lower cover plate, Figs. 10, 12 and 14 are longitudinal sections of the upper reed plate, the body of the organ, and the lower reed plate, Figs. 11, 13, and 15 are cross sections on the corresponding lines in Figs. 10, 12, and 14, Fig. 18 is a plan view of one end of the upper reed plate, Figs. 19 and 21 are perspective views of the corresponding ends of the upper and lower cover plate, and Fig. 20 is a perspective view of the corresponding end of the organ body, with the two reed plates in position.

Referring now to Figs. 1 to 5, 1 is the generally wooden, body of the organ in which the usual tone cells 1' are formed, 2 and 3 are the reed plates, 4, 4 are grooves extending along the edges of said reed plates, and 6 and 6' are the upper and lower cover plates. The cover plates are equipped with vertical flanges 5, 5 along their longitudinal edges, and with vertical flanges 7 and 9, respectively, at their transverse edges. Projections 8 and 10, respectively, extend at right angles from the ends of said flanges 7 and 9 on the inside. Slots 11 are formed in the flanges 7 of the upper cover plate and adapted to be engaged by the projections 10 of the lower cover plate.

To assemble the organ, the upper and lower reed plates 2 and 3 are placed on the body 1, the upper cover plate 6 is placed on the reed plate 2 with its longitudinal flanges 5 engaging the grooves 4 of the plate, and its projections 8 engaging below the lower reed plate 3. Then, the lower cover plate 6' is placed on the lower reed plate 3, its longitudinal flanges engaging the grooves 4 of said plate, and its projections 10 are inserted in the slots 11 of the flanges 7. The cover plates are of resilient material and are slightly deformed when being assembled so that their reaction holds the assembled parts firmly engaged.

For taking apart the instrument, the projections 10 of the lower cover plate are withdrawn from the slots 11 and the parts may then be separated.

Referring now to Figs. 6 to 21, the body 21 with its tone cells 22 is provided with the upper and lower cover plates 29 and 30, respectively, which are of resilient material and are here shown flat instead of arched as in Figs. 1 to 5, and 24 and 25 are the upper and lower reed plates, respectively, which are grooved at 34 and 37 to receive the longitudinal flanges 33 of the lower, and 33' of the upper cover plate.

The upper reed plate 24 is slotted at both ends, and one of such slots, 23, is visible in Fig. 18 from which it will appear that it consists of a comparatively long transverse slot and an extension 27 which is somewhat shorter than the slot 23. Corresponding slots 23' are formed in the body 21. The slots in the plate and the body are adapted to be entered by tongues 26 punched from the lower reed plate 25 and provided with projections 28 at their upper ends so that they are substantially T-shaped. The length of the slots 23 is substantially equal to the overall width of the projections 28 and the length of the extensions 27 is substantially equal to the width of the tongue bodies.

The upper cover plate 29 is provided with transverse flanges 35 slotted at 36, and the lower cover plate 30 is provided with transverse flanges 31 from which projections 32 are punched.

To assemble the instrument, the upper reed plate 24 is placed on the body 21 with the slots 23 and 23' registering, then the extensions 28 at the ends of the tongues 26 of the lower reed plate 25 are inserted through the slots 23' and 23 until the projections 28 are at the level of the upper reed plate, and the lower reed plate is shifted to the right in Fig. 18 to bring the tongue bodies 26 into the short extensions 27 of the slots so that the reed plates are interlocked. Preferably, both reed plates, or one of them, are bent to slightly convex shape on the side which rests on the body 21 so that they are deformed when the projections 28 engage the upper reed plate and the plates are thus held firmly against the body 21.

When the reed plates are in position, the cover plates 29 and 30 are placed on the corresponding reed plate so that the flanges 33 and 33' of the cover plates engage the grooves 34 and 37 of the reed plates and the slots 36 in the flanges 35 slip over the projections 32 of the flanges 31 so that the assembled parts are firmly held by resilient reaction and lateral displacement of the reed plates is prevented by the flanges 31 of the lower cover plate 30.

When it is desired to take asunder the instrument, the flanges 35 of the cover plate 29 are bent outwards so that their slots 36 become disengaged from the projections 32 of the flanges 31, the cover plates are removed, the lower reed plate 25 is moved to the right in Fig. 18 until the projections 28 register again with the slots 23 and 23', and the lower reed plate may now be removed.

With this arrangement, it is possible to exchange the reed plates and thereby to convert a mouth organ of a given pitch to another pitch, such as octave, third, and contra. The player is thus enabled to play the same instrument with any number of various pitches and tones, and does not require a separate instrument for each pitch or tone.

The novel organ may be modified as to size and construction without departing from my invention, and, if desired, the mouth piece may be made concave instead of convex.

I claim:

1. In a mouth organ, a pair of reed plates, and resilient means carried by one of the reed plates to interlock the plates and removably secure the same to the organ.

2. In a mouth organ, an organ body having a slot therein, a pair of reed plates arranged on said organ body, one of the reed plates having a slot corresponding to the slot in the organ body, and a resilient tongue on the other reed plate, said resilient tongue being adapted to extend through the slot in the organ body and removably engage the slot in the other reed plate to interlock the organ body and the reed plates.

3. A mouth organ comprising an organ body, a reed plate, arranged on one side of said body, a reed plate arranged on the other side of said body, means on said reed plates for detachably interlocking the same, and resilient cover plates detachably anchored together to removably retain said reed plates in interlocked position.

4. A mouth organ comprising a body, reed plates arranged on said body, resilient cover plates engaging said reed plates, flanges on said resilient cover plates, one of said flanges having a slot and the other having a projection adapted to enter said slot to removably secure the cover plates together and to the body.

5. A mouth organ comprising a body, a resilient reed plate arranged on one side of said body, a reed plate arranged on the other side of said body, one of said reed plates having slots and the other being provided with projections adapted to enter said slots to become detachably locked therein, and resilient cover plates detachably anchored on said body to removably hold said reed plates in interlocked position.

6. A mouth organ comprising a body, reed plates arranged on the sides of the body, said reed plates having longitudinal grooves therein, and resilient cover plates having longitudinal flanges engaging the grooves in the reed plates, said cover plates having end flanges detachably anchored together to removably hold the reed plates in position.

7. A mouth organ comprising an organ body, a pair of reed plates, and resilient means for removably securing said reed plates to the organ body.

8. A mouth organ comprising a body, reed plates on said body, resilient cover plates engaging said reed plates, and resilient interlocking means on said cover plates to detachably connect the same for removably securing the cover plates and the reed plates to the body.

In testimony whereof, I have signed my name to this specification at Dresden this 23rd day of February, 1926.

OTTO BRUNO FRIEDEL.